July 24, 1951  R. A. SCHULTZ  2,561,538
MACHINE FOR COOKING FRANKFURTERS, BUNS AND THE LIKE
Filed Aug. 24, 1948  3 Sheets-Sheet 3
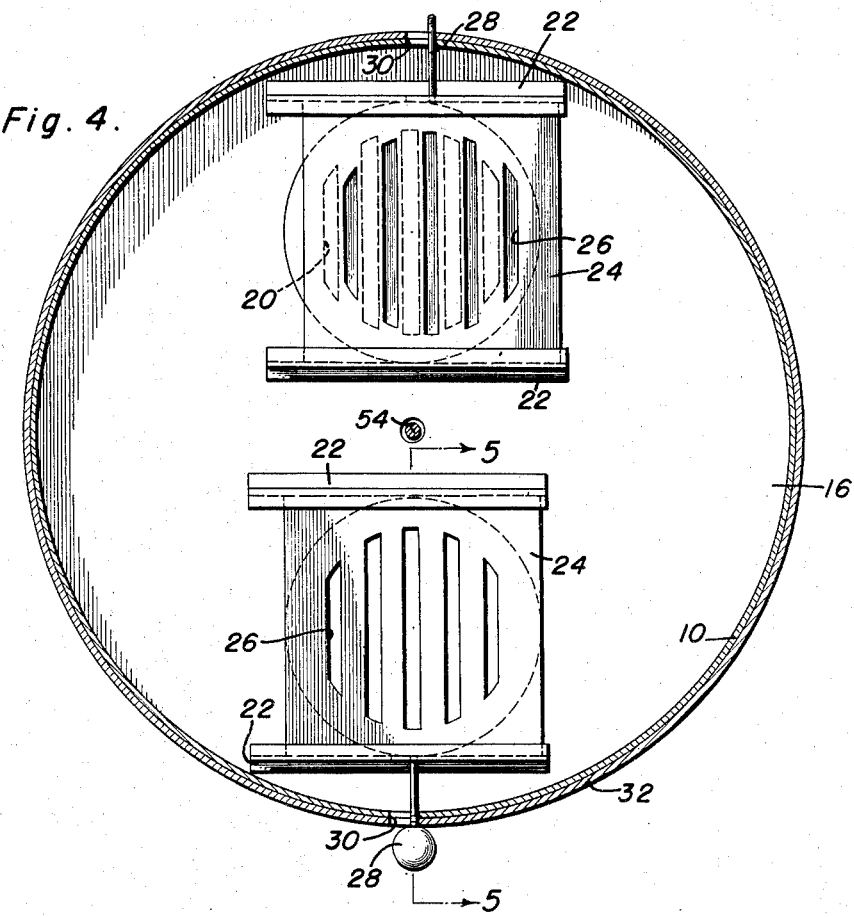
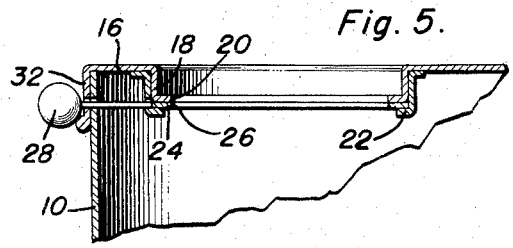
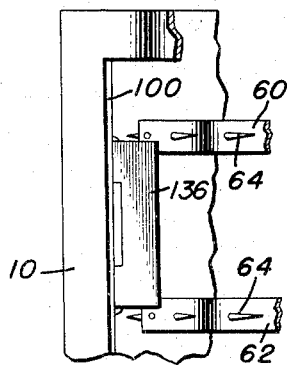
Rudolph A. Schultz
INVENTOR.

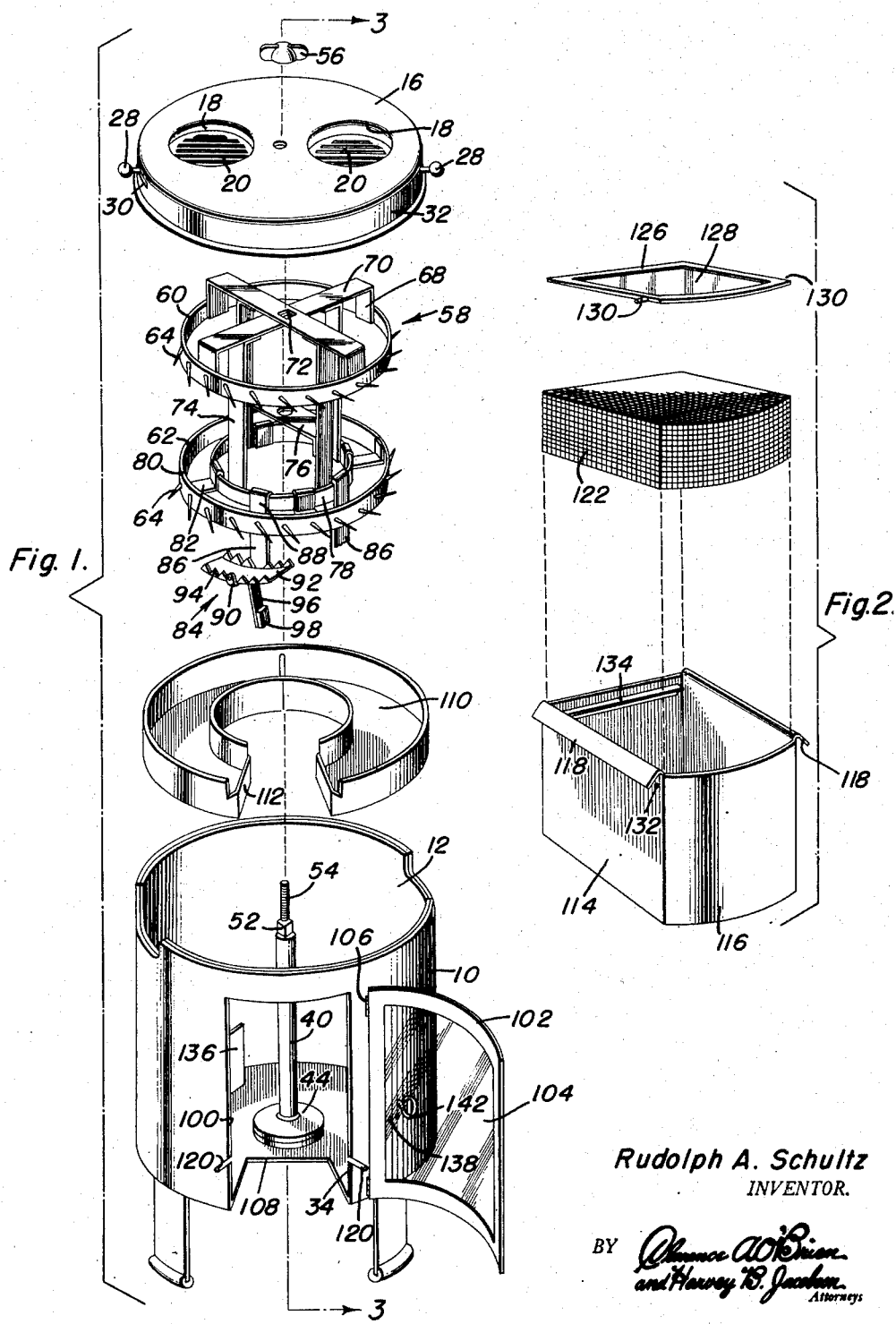

Patented July 24, 1951

2,561,538

UNITED STATES PATENT OFFICE 2,561,538

MACHINE FOR COOKING FRANKFURTERS, BUNS, AND THE LIKE

Rudolph A. Schultz, Hagerstown, Md.

Application August 24, 1948, Serial No. 45,887

5 Claims. (Cl. 99—420)

This invention relates to new and useful improvements in heating machines and the primary object of the present invention is to provide a machine for heating, cooking or roasting hot dogs, sausages, buns and other such foodstuff.

Another important object of the present invention is to provide a machine for heating or roasting edibles including a rotary member, a pivotal bun support, and novel and improved means engaging and rocking said bun support as the rotary member is rotated to release a bun into a suitable receptacle.

Yet another object of the present invention is to provide a rotary support including a group of prongs adapted to receive meat such as hot dogs and embody novel and improved stop means engageable with the articles on the prongs to release the same as the support is rotated at a predetermined rate of speed.

Another feature of the present invention is to provide a roasting and heating machine for food stuff and embodying in its construction a group of associated elements which are quickly and readily assembled or disassembled in a convenient manner permitting the same to be cleaned and retained in a sanitary condition for continued use.

Another feature of the present invention is to provide a heating machine including an oven and embodying novel and improved means for receiving coffee pots, containers and the like whereby the same will remain desirably heated until ready for use.

A further object of the present invention is to provide a machine of the aforementioned character that includes a novel and improved food retaining container so designed as to retain food placed therein in a warm, fresh condition.

A still further aim of the present invention is to provide a machine for heating hot dogs, buns and the like that is simple and practical in construction, strong and reliable in use, neat and attractive in appearance, small and compact in structure, relatively inexpensive to manufacture, efficient and durable in operation, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a group perspective view of the heating machine constructed in accordance with the present invention, the heating coils and food receptacle removed therefrom;

Figure 2 is a group perspective view of the food receptacle, the drainage screen and closure for the food receptacle that is used in conjunction with the present invention;

Figure 4 is a transverse horizontal sectional view taken substantially on the plane of section line 4—4 of Figure 3;

Figure 5 is a fragmentary, longitudinal vertical sectional view taken substantially on the plane of section line 5—5 of Figure 4; and Figure 6 is a fragmentary front elevational view of the present invention and illustrating the manner in which the hot dogs are released from the supporting prongs.

Figure 3:
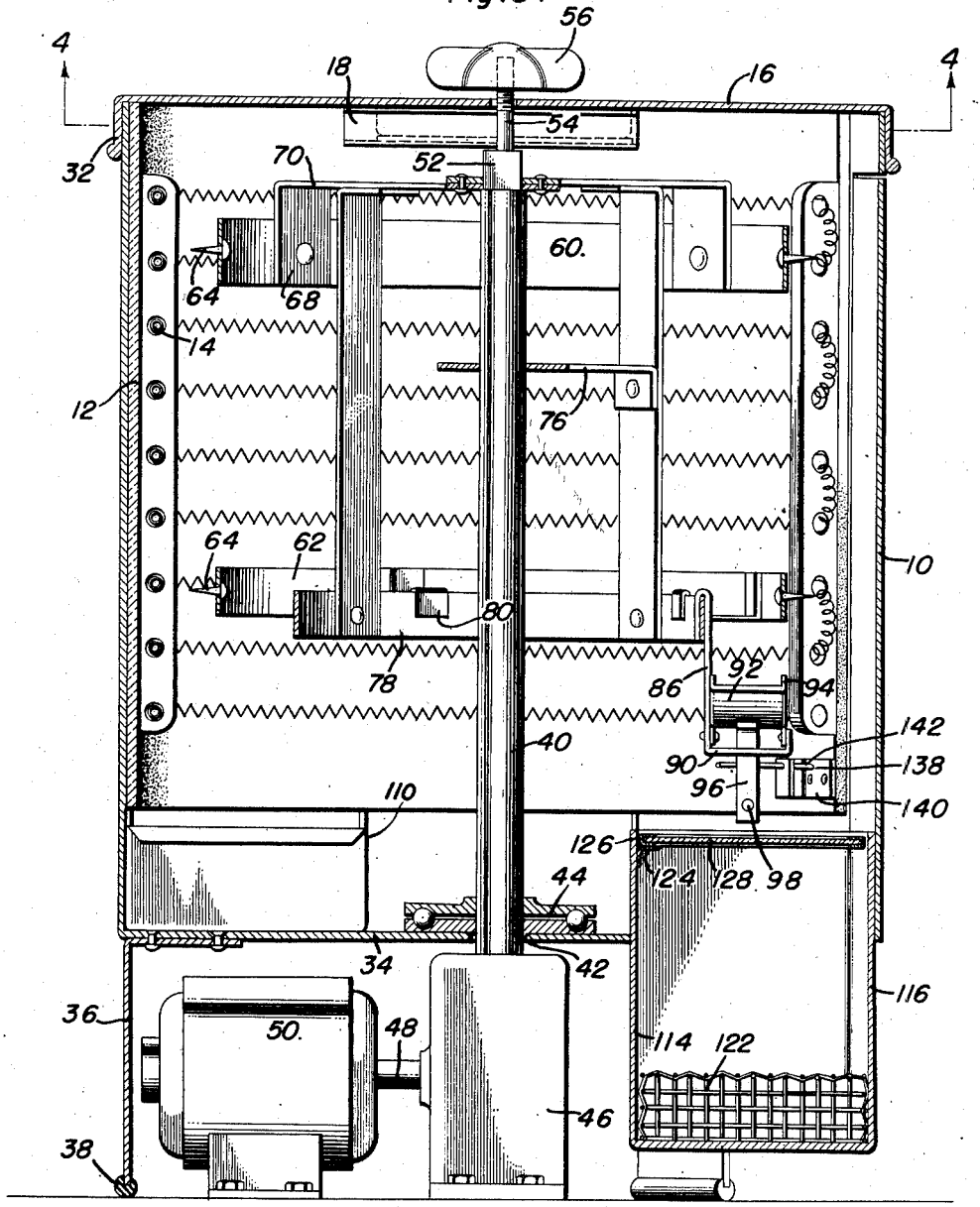
Figure 3 is a longitudinal vertical sectional view taken substantially on the plane of section line 3—3 of Figure 1 and showing the elements assembled.

Referring now to the drawings in detail, wherein for the purpose of illustration, there is disclosed a preferred embodiment of the present invention, the numeral 10 represents a hollow, cylindrical casing to the inner surface of which there is fixed a suitable insulating material 12 to which there is fixed a plurality of heating coils 14 which are preferably activated by electricity although any suitable means may be employed by gas, oil, gasoline or the like.

The upper open end of the casing 10 is provided with a removable closure 16 having a plurality of preferably annular recesses 18 the bottom walls of which are provided with a plurality of spaced vent openings or slots 20.

Pairs of substantially channel shaped guide tracks 22 are secured to the underside of the closure or upper wall 16 and each pair thereof slidably receive a closure plate 24 having openings 26 that will register with the openings 20 in the bottom walls of the recesses 18 to permit heated air to pass outwardly of the casing 10 in order to heat containers, cans, coffee pots or the like which are placed in the said recesses 18.

A suitable finger grip 28 is fixed to each slidable closure 24 and are movable in opposed arcuate slots 30 provided in the casing 10 and the depending flanged portion 32 of the closure 16 so that the plates 24 may be moved for controlling the passage of air through the openings 20.

Fixed to and depending from the bottom wall 34 of the casing 10, is a plurality of circumferentially spaced legs 36 having substantially cylindrical bearing feet or rollers 38.

A driven shaft 40 projects upwardly through an aperture 42 provided in the bottom wall 34 and is journaled for rotation in a bearing 44 fixed to the bottom wall 34. The lower end of the driven shaft 40 is positioned in a suitable reduction gearing housing 46 that is operatively connected to the drive shaft 48 of a preferably electric motor 50.

Projecting upwardly from the reduced substantially square portion 52 of the driven shaft 40, is an externally threaded rod 54 that extends through the upper wall or closure 16 and receivably engages a nut 56.

The numeral 58 represents the rotary member or support that is used in conjunction with the present invention generally, including upper and lower ring elements 60 and 62 to which there is fixed a plurality of circumferentially spaced prongs or pointed elements 64 that are inclined relative to the ring elements 60, 62 for a purpose which will later be more fully apparent.

The leg portions 68 of a pair of criss-crossed U-shaped members 70 are fixed to the inner periphery of the upper ring element 60 and the central portions of the members 70 are provided with opposed substantially square openings 72 that receive the square portion 52 of the driven shaft 40 whereby the members 58 will be supported in the shaft 40 for rotation therewith.

A plurality of hanger straps 74 depend from the members 70 and are braced by apertured straps 76 that receive the shaft 40 to prevent tilting movement of the member 58 relative to the shaft 40.

The lower free ends of the hangers 74 are fixed to an inner ring 78 that removably engages U-shaped clips 80 at the inner ends of a plurality of circumferentially spaced radial arms 82 that are fixed to the inner surface of the lower ring element 62.

The numeral 84 represents a group bun supporting members that are used in conjunction with the present invention generally. Each of the members 84 includes a depending hanger arm 86 the upper end of which is turned inwardly to provide a loop 88 that detachably engages the ring 78. The lower free end of the hanger arm 86 terminates in a channel portion 90 that pivotally supports the central portion of a concavo-convexed plate 92 having upstanding teeth 94 at the side edges thereof.

A counter weight supporting arm 96 depends from the plate 92 and holds a weighted mass 98 that urges the plate 92 to its carrying position.

A substantially rectangular entrance opening 100 is provided in the casing 10 and is closed by an arcuate door 102, supporting a transparent panel 104, that is hinged to the casing 10 as at 106. The bottom wall 34 is also provided with an opening 108 that communicates with the opening 100, as shown best in Figure 1 of the drawings.

An arcuate, substantially channel shaped trough 110 is disposed in the casing 10 and is supported on the bottom wall 34 of the casing 10. The spaced end walls 112 of the trough 110 terminate adjacent the openings 100 and 108.

A substantially rectangular receptacle or storage container 114 having an arcuate forward or outer wall 116 is disposed in the opening 108 and a portion of the opening 100. Inclined flanges 118 project outwardly from the open upper end of the receptacle 114 and are slidably received in inclined notches 120 formed in the casing 10 that communicates with the opening 100.

A screen or drainage unit 122 is detachably supported in the receptacle 114 on the bottom wall thereof and rises therefrom.

The open end of the receptacle 114 is closed by an arcuate concavo-convexed door or closure 126 supporting a transparent panel 128. Trunnions or pivot pins 130 project outwardly from opposite sides of the door 126 and are pivotally received in openings 132 in the sides of the receptacle 114. The door 126 is normally supported in a closed position by an angle bracket 134 carried by the inner wall of the receptacle 114.

Pivotally secured to the inner surface of the casing 10, is a substantially rectangular pressure plate 136 that is positioned between the ring elements 60 and 62 and adjacent the opening 100.

Detachably supported in one of a selected group of apertures 138 in the casing 10 and a bracket 140 fixed to the casing 10, is a stop pin 142 that will engage the arms 96 depending from the members 92 during rotation of the support 58.

In practical use of the present invention, hot dogs, meat cakes or the like are applied to the prongs 64 and buns, rolls and the like are placed on the plates 92. As the shaft 40 and member 58 rotate, the hot dogs will be ejected or forced from the prongs 64, due to the inclined position thereof, and the hot dogs will fall into the receptacle 114, it being understood that the closure 126 will normally be raised.

As the member 58 rotates, the stop pin 142 engages the arms 96 of the members 84 rocking the plates 92 to release the buns from the plates 92 whereupon the same will also drop into the receptacle 114.

The food stuffs being disposed in the receptacle 114, it is merely necessary to close the closure 126 in order to retain the food stuffs warm and fresh, the excess grease or the like draining through the screen unit 122.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. In a heating machine, a casing, a rotary member disposed within said casing, means for rotating said rotary member, a receptacle removably supported by said casing, a plurality of meat supporting elements held stationary on and rotatable with said rotary member, means supported on the casing for removing meat from said elements as the same approach said receptacle, bun supports rockably carried by said rotary member adapted to receive a bun, means sequentially engageable with said bun supports for releasing a bun therefrom simultaneously with the releasing of meat from said elements as the bun supports sequentially approach said receptacle, and means for heating said casing.

2. The combination of claim 1 wherein said means for removing meat from said elements includes a pivotal ejector plate carried by said casing, and disposed above said receptacle.

3. In a heating machine, a rotary member including a ring, a power means operatively connected to and rotating said member, a hanger arm having a terminal hook received on said ring, a bun support pivoted to said arm for rocking movement, a counter weight supporting arm depending from said bun support and urging the bun support to its carrying position, and a stop pin engageable with said counter weight supporting arm during rotation of said member for rocking the bun support to release a bun therefrom.

4. The combination of claim 3 and a further ring embracing said first mentioned ring, means carried by said further ring for supporting meat thereon, and means removably securing said further ring to said first mentioned ring for simultaneous rotation of said two rings as a unit.

5. The combination of claim 4 wherein said last mentioned means includes a plurality of circumferentially spaced radial arms having U-shaped end portions receiving said first mentioned ring.

RUDOLPH A. SCHULTZ.

REFERENCES CITED

The following references are of record in the file of this patent:

UNITED STATES PATENTS

| Number | Name | Date |
|---|---|---|
| 605,536 | Brice | June 14, 1898 |
| 629,945 | Yerby et al. | Aug. 1, 1899 |
| 1,252,613 | Phelps | Jan. 8, 1918 |
| 1,271,326 | Kivlan | July 2, 1918 |
| 1,301,997 | Becker | Apr. 29, 1919 |
| 1,310,495 | Ford | July 22, 1919 |
| 1,631,655 | Sunderland et al. | June 7, 1927 |
| 1,634,142 | Hammond | June 28, 1927 |
| 1,696,613 | Shroyer | Dec. 25, 1928 |
| 1,723,145 | Fernald | Aug. 6, 1929 |
| 1,776,501 | Grady | Sept. 23, 1930 |
| 1,790,488 | Saunders et al. | Jan. 27, 1931 |
| 1,854,850 | Lin Kenauger | Apr. 19, 1932 |
| 1,993,609 | Kennedy | Mar. 5, 1935 |
| 2,112,309 | Santillan | Mar. 29, 1938 |
| 2,142,390 | Zerr | Jan. 3, 1939 |
| 2,492,021 | Freloar | Dec. 20, 1949 |

FOREIGN PATENTS

| Number | Country | Date |
|---|---|---|
| 243,996 | Germany | Feb. 28, 1912 |
| 571,203 | Great Britain | Aug. 10, 1945 |